(12) United States Patent
Linnersten et al.

(10) Patent No.: US 6,585,790 B2
(45) Date of Patent: Jul. 1, 2003

(54) CONICALLY SHAPED AIR-OIL SEPARATOR

(75) Inventors: Staffan B. Linnersten, Burnsville, MN (US); Christopher D. Radcliff, Deerfield, OH (US); Brian Read, Burnsville, MN (US); Wijadi Jodi, Eden Prairie, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 10/282,334

(22) Filed: Oct. 28, 2002

(65) Prior Publication Data

US 2003/0051450 A1 Mar. 20, 2003

Related U.S. Application Data

(63) Continuation of application No. 09/623,095, filed as application No. PCT/US99/04392 on Mar. 1, 1999, now Pat. No. 6,485,535.
(60) Provisional application No. 60/076,397, filed on Feb. 28, 1998.

(51) Int. Cl.[7] .............................................. B01D 46/00
(52) U.S. Cl. ............................ 55/319; 55/323; 55/337; 55/486; 55/487; 55/521; 55/DIG. 17
(58) Field of Search .......................... 55/319, 323, 337, 55/486, 487, 521, 327, 330, 395, 423, 320, 392, 421, 429, 466, DIG. 17

(56) References Cited

U.S. PATENT DOCUMENTS

| 552,572 A | 1/1896 | Austin |
|---|---|---|
| 1,922,688 A | 8/1933 | Kamrath |
| 2,095,586 A | 10/1937 | Algard |
| 3,085,381 A | 4/1963 | Sobeck |
| 3,252,270 A | 5/1966 | Pall et al. |
| 3,364,658 A | 1/1968 | Walker |
| 3,698,161 A | 10/1972 | Brixius et al. |
| 3,823,791 A | 7/1974 | Sheler |
| 4,078,036 A | 3/1978 | Keefer |
| 4,111,815 A | 9/1978 | Walker et al. |
| 4,130,487 A | 12/1978 | Hunter et al. |
| 4,243,397 A | 1/1981 | Tokar et al. |
| 4,272,318 A | 6/1981 | Walker et al. |
| 4,498,915 A | 2/1985 | Witchell |
| 4,814,033 A | 3/1989 | Spearman et al. |
| 4,836,931 A | 6/1989 | Spearman et al. |

(List continued on next page.)

FOREIGN PATENT DOCUMENTS

| GB | 1 566 220 | 4/1980 |
|---|---|---|
| WO | WO 00/72948 | 12/2000 |
| WO | WO 01/80982 | 11/2001 |

*Primary Examiner*—Duane S. Smith
(74) *Attorney, Agent, or Firm*—Merchant & Gould P.C.

(57) ABSTRACT

A liquid reservoir tank assembly includes a gas-liquid separator, such as an air-oil separator. A tank body has an open end, a portion of the tank body forming a liquid separation chamber, another portion of the tank body forming a liquid reservoir. A tank cover covers the open end of the tank body, the tank body and the tank cover providing a gas inlet and a gas outlet with a gas flow through the separation chamber from the gas inlet to the gas outlet. The gas-liquid separator is mounted in the separation chamber in the gas flow between the gas inlet and the gas outlet. The separator has a coalescing stage layer and a drain stage layer arranged radially symmetrically about an axis extending through the interior of the separator, the coalescing stage layer being upstream of the drain stage layer. Each of the layers is generally frustoconical in shape.

20 Claims, 5 Drawing Sheets

U.S. PATENT DOCUMENTS

| | | |
|---|---|---|
| 4,872,890 A | 10/1989 | Lamprecht et al. |
| 4,878,929 A | 11/1989 | Tofsland et al. |
| 5,053,126 A | 10/1991 | Krasnoff |
| 5,129,923 A | 7/1992 | Hunter et al. |
| 5,302,354 A | 4/1994 | Watvedt et al. |
| 5,454,945 A | 10/1995 | Spearman |
| 5,522,909 A | 6/1996 | Haggard |
| 5,549,722 A | 8/1996 | Zemaitis et al. |
| 5,605,555 A | 2/1997 | Patel et al. |
| 5,632,793 A | 5/1997 | Haggard |
| 5,660,607 A | 8/1997 | Jokschas et al. |
| 5,750,024 A | 5/1998 | Spearman |
| 5,792,711 A | 8/1998 | Roberts |
| 5,853,443 A | 12/1998 | Rodgers et al. |
| 5,916,435 A | 6/1999 | Spearman et al. |
| 6,093,231 A | 7/2000 | Read et al. |
| 6,136,076 A | 10/2000 | Read |
| 6,419,721 B1 * | 7/2002 | Hunter |
| 6,485,535 B1 * | 11/2002 | Linnersten et al. |

* cited by examiner

CONICALLY SHAPED AIR-OIL SEPARATOR

This application is a continuation of U.S. patent application Ser. No. 09/623,095, filed on Oct. 20, 2000 now U.S. Pat. No. 6,485,535, which claims priority to International Patent Application No. PCT/US99/04392 filed on Mar. 1, 1999, which claims benefit of 60/076,395 filed Feb. 28, 1998.

BACKGROUND OF THE INVENTION

1. Field of the Invention

This invention relates to filtering of liquids from gaseous streams, and more particularly to air-oil separators such as those used to remove suspended oil in compressor air discharge systems.

2. Description of the Prior Art

Gas-liquid separators are used in various applications, but are most notably used to separate oil from air. Air-oil separators are typically used where it is necessary to remove suspended oil mist from an air stream, such as in the air discharge systems of air compressors, vacuum compressors and refrigerant compressors. The separator allows the discharged air to be used without the contamination of the oil which has entered the air in the compressor, and provides for the recovery of the oil so that it can be reused. The air-oil separator is typically mounted in a housing or tank having a separation chamber through which the air flows above an oil reservoir. The separator includes coalescing media through which the discharge air passes while the oil is separated from the air flow. The coalescing media is cylindrically shaped and is typically mounted vertically, that is, in which the axis of the cylindrical coalescing media extends in a vertical direction. A shroud may be provided within the separation chamber around the separator to slow the air flow and provide a vertical direction to the air flow as it encounters the separator. The contaminated air usually enters the separation chamber from outside the air-oil separator and flows into the center of the separator where it then flows axially out of the separation chamber. As the air flows radially through the layers of the separator, the oil coalesces and collects in the interior of the separator where it can be syphoned off or drained into the reservoir, typically by means of a scavenging system, so that it can be reused. The flow directions may also be reversed in which contaminated air is introduced into the center of the air-oil separator and flows radially outwardly through the separator with the oil coalescing and collecting on the outside of the separator where it drains into a reservoir. An example of a prior art air-oil separator is shown in U.S. Pat. No. 4,878,929.

The characteristics of the air flow and the size of the separator are limited by the cylindrical configuration of the separator. For example, where the air flows from the outside of the separator into the separator and a shroud is used around the separator in the separation chamber, the air must flow through the narrow annular chamber between the shroud and the outside of the separator before it enters the separator. This annular chamber has a constant cross section, but the air volume decreases through this chamber since some of the air enters the separator, and thus the air velocity decreases toward the top of the separator. Since sufficient clearance must be provided between the shroud and the outside of the separator, particularly at the bottom of this annular chamber, the size of the separator, and thus the effective surface area provided by the separator, is limited by the size of the shroud.

SUMMARY OF THE INVENTION

The present invention provides advantages over the prior art designs of air-oil separators that have not been realized heretofore. The present invention provides an air-oil separator which is generally conically shaped, providing a greater effective surface area over the same axial length than the prior art cylindrically shaped separators, since the generally conically shaped separator can be made with a larger diameter at the upper end while still providing sufficient clearance from the shroud at the lower end.

The air-oil separator of the present invention also provides a funnel type action to direct the flow of scavanged oil into a pool or reservoir where the oil can be more easily collected. This feature may be particularly advantageous when the separator is mounted in a horizontal orientation, that is, in which the axis of the separator extends horizontally. In this configuration, the prior art cylindrical separator collected oil along the bottom portion of the separator, and, since the separator extended horizontally, the oil tended to accumulate in this portion of the separator and not readily to drain off. Because the generally conically shaped separator of the present invention has a sloped bottom surface when mounted horizontally, the oil more readily drains from the separator and does not tend to collect in the bottom portion of the separator and inhibit separator performance. As a result, the separator has a longer life because it is not contaminated with accumulated oil.

The generally conically shaped air-oil separators of the present invention may be used in existing oil reservoir tank designs, thus eliminating the need for modification. They may also be used in an inventive new oil tank design which utilizes the advantages of the generally conically shaped separators.

These and other advantages are provided by the present invention of a liquid reservoir tank including a gas-liquid separator, comprising a tank body having an open end, a portion of the tank body forming a liquid separation chamber, another portion of the tank body forming a liquid reservoir; a tank cover covering the open end of the tank body, the tank body and the tank cover providing a gas inlet and a gas outlet with a gas flow through the separation chamber from the gas inlet to the gas outlet; and a gas-liquid separator mounted in the separation chamber in the gas flow between the gas inlet and the gas outlet, the separator comprising a coalescing stage layer and a drain stage layer arranged radially symmetrically about an axis extending through the interior of the separator, one of the layers positioned within the other of the layers, the coalescing stage layer being upstream of the drain stage layer, each of the layers being generally frusto-conical in shape whereby both of the layers are closer to the axis at one end than at the other end.

DETAILED DESCRIPTION OF THE PREFERRED EMBODIMENT

Figure 1:
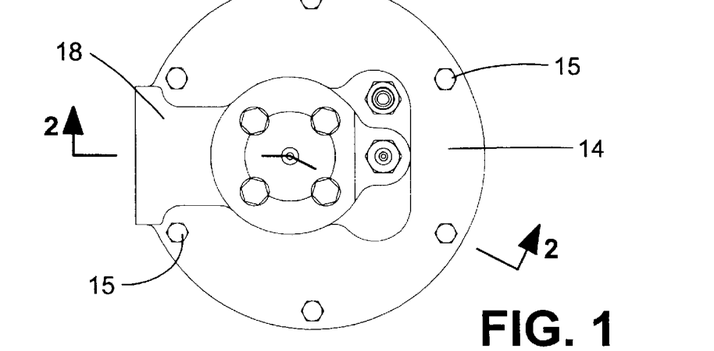
FIG. 1 is a top plan view of an oil reservoir tank assembly with an air-oil separator according to the present invention.
Figure 2:
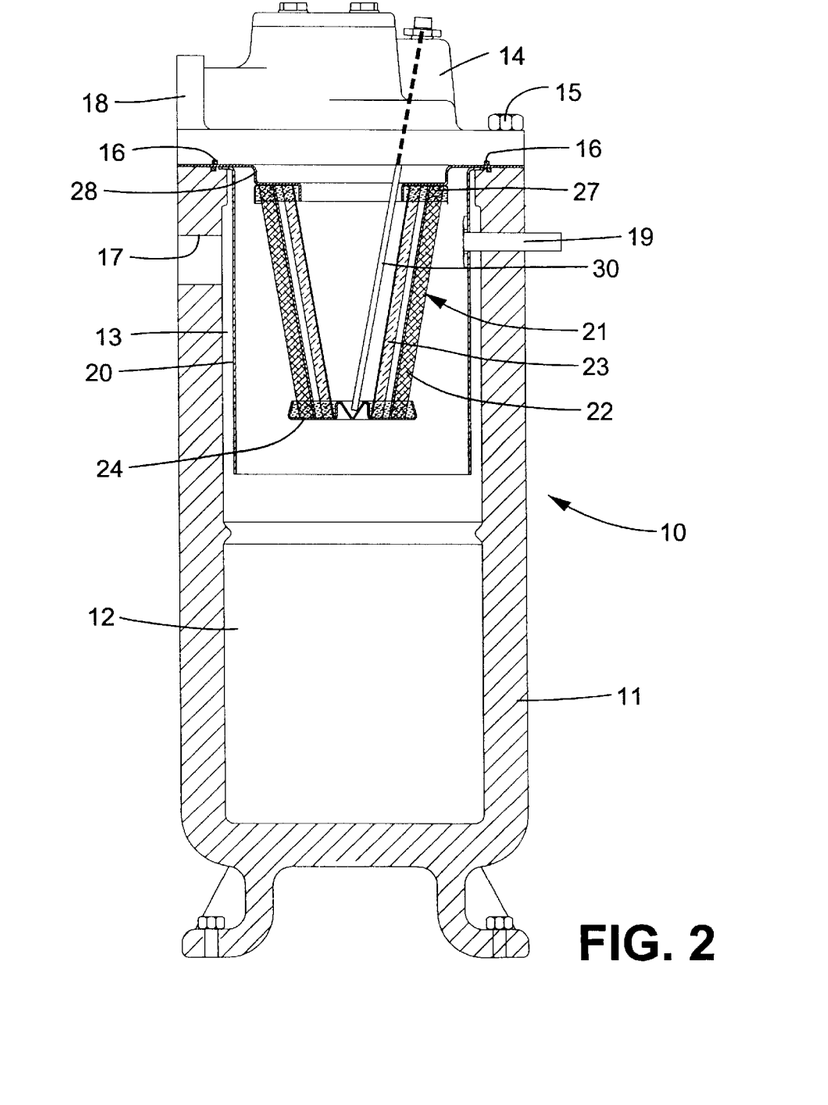
FIG. 2 is a side sectional view of the oil reservoir tank assembly taken along line 2—2 of FIG. 1.

Referring more particularly to the drawings and initially to FIGS. 1 and 2, there is shown an oil tank assembly 10 according to the present invention. The tank assembly shown and described herein is only one of many arrangements in which the present invention may be used, and the tank and separation configuration may be altered significantly without affecting the present invention. The tank assembly 10 comprises a body 11 having a reservoir 12 formed at the bottom for collection of oil removed by in the oil separation process. The upper portion of the body 11 forms a separation chamber 13. The top of the separation chamber 13 is enclosed by a tank cover 14 which is attached to the body 11 by a plurality of bolts 15 or other suitable fastening devices. A tank seal or gasket 16 is proved around the upper rim of the body 11, between the body and the tank cover. Preferably, the tank seal 16 comprises an O-ring provided in a corresponding groove in the bottom of the tank cover 14 and another O-ring provided in a corresponding groove on the top of the upper rim of the tank body 11. An air inlet 17 is provided on one side of the body 11 for air to enter the separation chamber 13. The air flows from the separation chamber through a passage (not shown) in the tank cover 14 and through an air outlet 18 provided in the tank cover.

Within the separation chamber 13 is a generally cylindrical shroud 20 which diverts the incoming air flow from the air inlet 17 and causes the air to flow down and around the shroud. This provides a first stage air-oil separation, in that, large droplets of oil are separated by the abrupt change in air flow and these oil droplets fall into the reservoir 12. A safety valve 19 is also provided in the body 11 extending through the shroud 20. The safety valve 19 is a pressure relief valve which opens in the event that air pressure inside the shroud 20 increases above a predetermined level. The air flow then passes upwardly and axially inwardly, through an air-oil separator 21 comprising two generally conically shaped or generally frusto-conically shaped layers 22 and 23.

Figure 3:
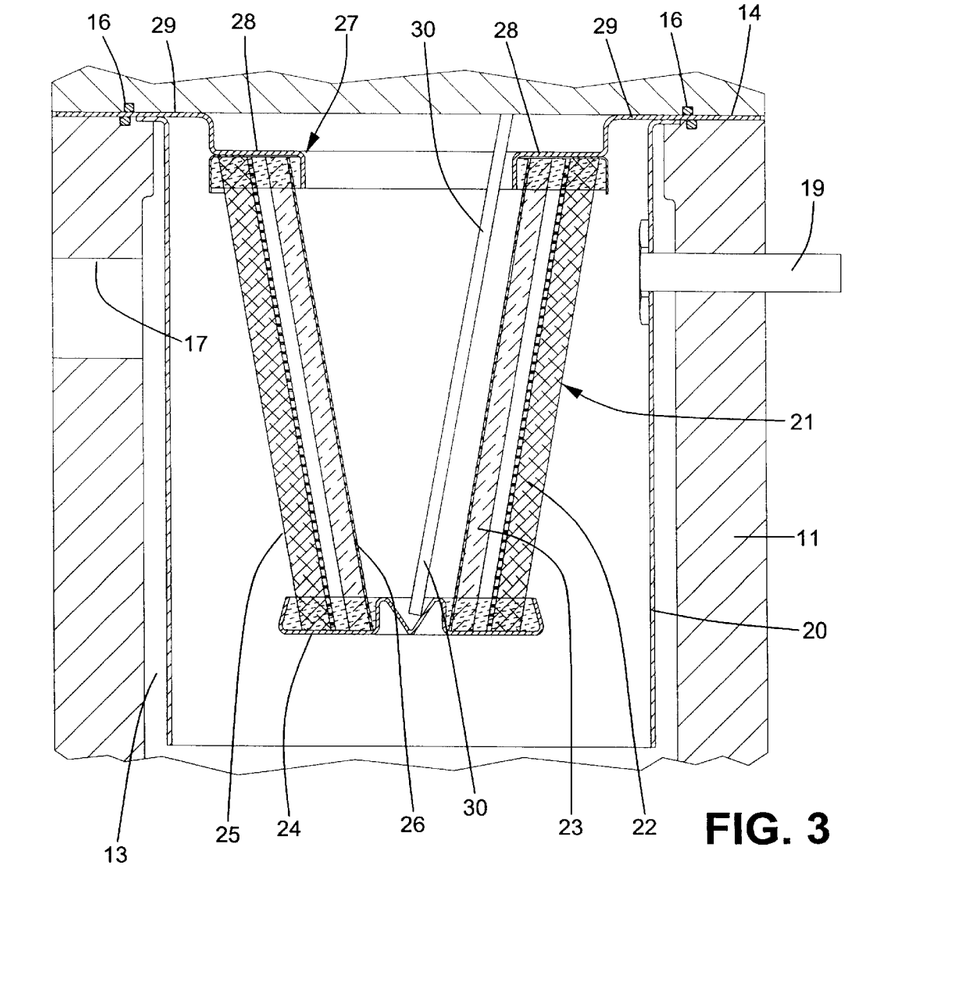
FIG. 3 is a detailed side sectional view of a portion of the air-oil separator of FIG. 2.
Figure 4:
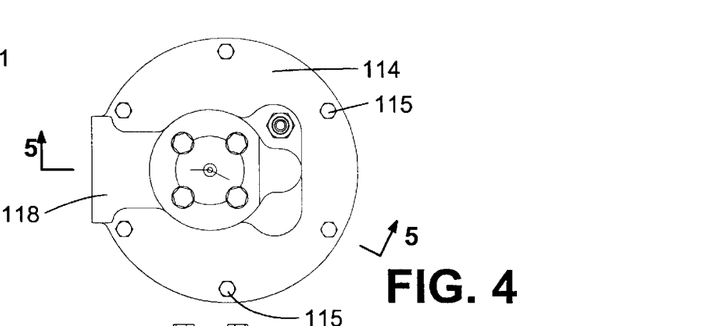
FIG. 4 is a top plan view of another oil reservoir tank assembly with an air-oil separator according to another embodiment of the present invention.
Figure 5:
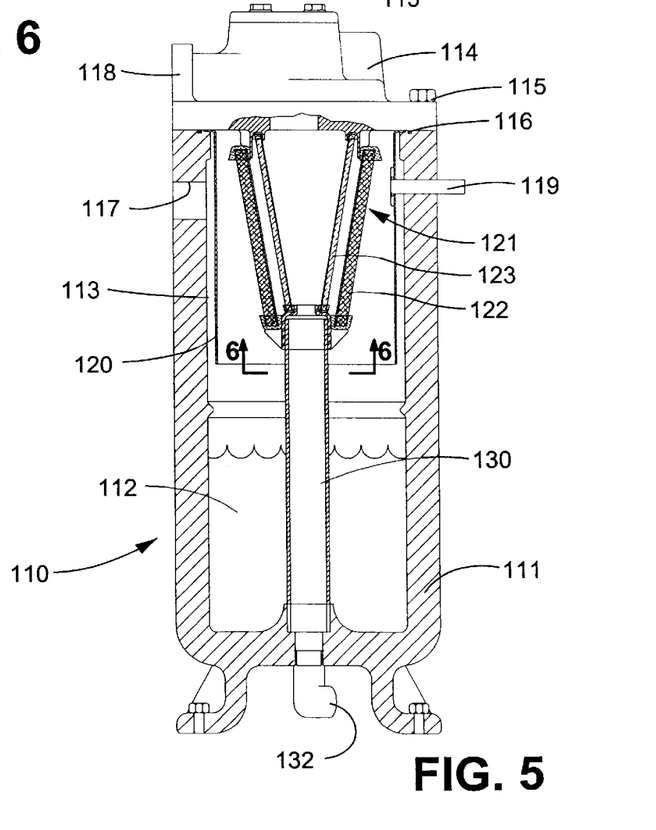
FIG. 5 is a side sectional view taken along line 5—5 of FIG. 4.
Figure 6:
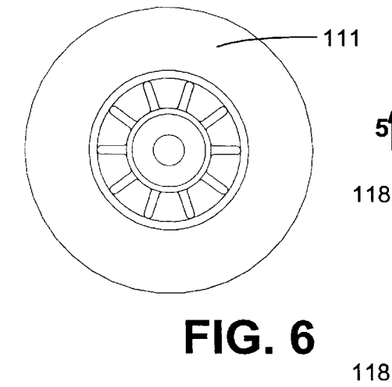
FIG. 6 is an end sectional view taken along line 6—6 of FIG. 5.
Figure 7:
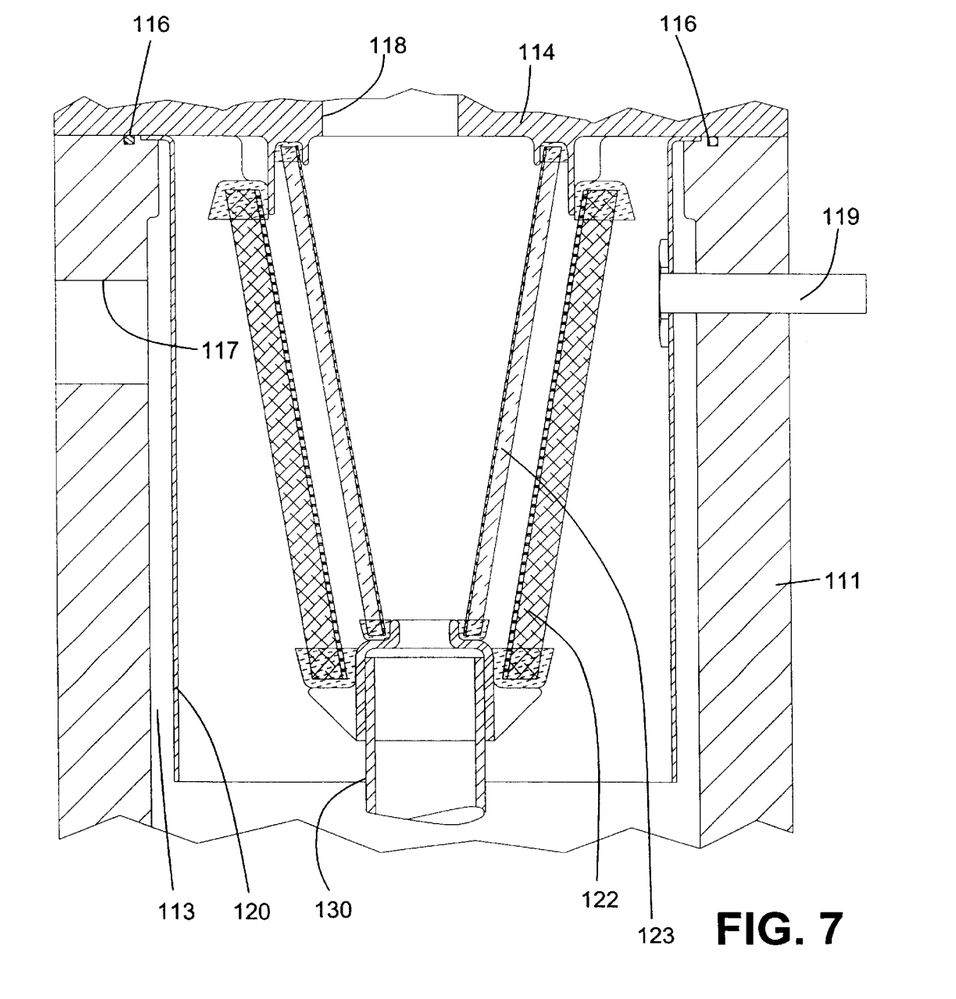
FIG. 7 is a detailed side sectional view of a portion of the air-oil separator of FIG. 5.

The upstream layer 22 is a coalescing stage layer. The downstream layer 23 is a drain stage layer. In the embodiment shown in FIG. 2 in which the flow of air is from the outside to the inside of the air-oil separator 21, the coalescing stage layer 22 is on the outside of the drain stage layer 23, and the drain stage layer is inside the coalescing stage layer. The layers 22 and 23 are each preferably made of a molded or formed media so that they can be readily shaped into the desired conical or frusto-conical configuration. A pleated or wrapped media may also be used. The layers are comprised of any suitable combination of materials used in air-oil separation, such as fiberglass, polyester, polypropylene or metal, some of which may be pleated in a conventional manner, or which may be molded, formed, wrapped or otherwise shaped. As shown in FIG. 3, the air-oil separator also preferably includes an outer wrap layer 25 on the exterior of the separator, and a support member 26 along the interior surface of the layer 23.

The layers 22 and 23, along with the layers 25 and 26, are assembled into an air-oil separator unit 21 which is mounted in the separation chamber 13 within the shroud 20. The lower ends of each of the layers 22, 23, 25 and 26 are set in a hardenable sealing material, such as urethane, epoxy or plastisol, which is molded in place in a generally circular, lower connection plate 24. The lower ends of the layers 22, 23, 25 and 26 are thus sealed to the lower connection plate 24, and fluid is prevented from flowing into or out of the interior of the separator, except through the layers. Alternatively, in place of the metal connection plate 24, the bottom ends of the layers 22, 23, 25 and 26 can be inserted into a plastic end cap made of a moldable plastic or elastic material such as polyurethane, which is molded in place; such a bottom end cap seals and holds the layers in position without a supporting metal connection plate. The upper ends of the layers 22, 23, 25 and 26 are set in a similar hardenable sealing material molded in an upper mounting plate assembly 27, a portion of which extends radially outwardly from the layers. As shown in FIG. 3, the assembly 27 comprises an inverted trough portion 28 which surrounds the hardenable material in which the ends upper ends of the layers 22, 23, 25 and 26 are set, and a flange portion 29 which extends between the upper rim of the body 11 and the tank cover 14 and is secured in place by the connection of the tank cover on the tank body. The portions 28 and 29 are attached together, such as by welding. The upper ends of the layers 22, 23, 25 and 26 are thus sealed to the upper mounting plate 27, and fluid is prevented from flowing into or out of the interior of the separator, except through the layers. Alternatively, in place of the upper mounting plate assembly 27, an integrated upper end cap and flange may be formed in accordance with the disclosure of U.S. patent application Ser. Nos. 09/174,137 and 09/174,139, now U.S. Pat. Nos. 6,136,076 and 6,093,231, respectively, the disclosures of which are hereby incorporated by reference in their entireties.

A scavenging tube 30 extends downwardly from the tank cover 14 into the separation chamber inside the drain stage layer 23. Oil draining from the layer 23 can be withdrawn therefrom using the drain tube 30.

Unlike the generally cylindrical air-oil separators of the prior art, the layers 22 and 23 of this invention are generally conically shaped, or frusto-conically shaped, providing a larger amount of active surface area per axial length of the separator element, and providing a funnel type shape into which the scavenged oil may flow to be withdrawn through the tube 30 using a conventional oil scavenging system.

The tank assembly 10 shown in FIGS. 1–3 is designed to allow the incorporation of the generally conically shaped air-oil separators in an otherwise conventionally designed air-oil separator. The uniquely shaped separators may also be incorporated into a tank assembly designed specifically for their use, and such a tank assembly 110 is shown in FIGS. 4–7. The tank assembly 110 has a body 111, a reservoir 112, a separation chamber 113, a tank cover 114, tank cover bolts 115, a tank seal 116, an air inlet 117, an air outlet 118, a safety valve 119, a shroud 120, and an air-oil separator 121 comprising a coalescing stage layer 122 and a drain stage layer 123, each of which is generally similar to the body 11, the reservoir 12, the separation chamber 13, the tank cover 14, the tank cover bolts 15, the tank seal 16, the air inlet 17, the air outlet 18, the safety valve 19, the shroud 20, the air-oil separator 21, the coalescing stage layer 22 and the drain stage layer 23 already described.

Unlike the layers 22 and 23 of FIGS. 2 and 3, the coalescing stage layer 122 and the drain stage layer 123 are each made as separate modules which can be individually removed. Each of the elements 122 and 123 is mounted at each end in integrated seals which can be made of urethane or any suitable material. Unlike the air-oil separator 21 of FIGS. 1–3, the air-oil separator is not assembled into an integrated unit. Instead, each of the elements 122 and 123 is separate and can be individually replaced as needed. The drain stage element 123 is self supporting. The coalescing stage element 122 is mounted in a frame the bottom of which is attached to a scavenge flow drain tube 130 which extends through the reservoir 112. At the bottom of the tube 130 is a scavenged oil return port 132.

While the air-oil separator of this invention has been described with reference to an oil tank having an outside-in air flow, that is, in which the air flows radially from outside the separator to the interior of the separator, it should be understood that the separator provides equal advantages when the air is flowing the opposite direction. Instead of air entering the oil tank assembly 10 through the inlet 17 and exiting through the outlet 18, the air flow may be reversed with the air entering the oil tank through the passage 18 and exiting through the passage 17. The air-oil separator provides the same advantages under these circumstances. Likewise, while the air-oil separator of this invention has been described with reference to a separator which is mounted vertically in an oil tank assembly, that is in which the axis of the separator extends vertically, the advantages of the separator of this invention can also be realized in configurations in which the separator is mounted horizontally.

Figure 8:
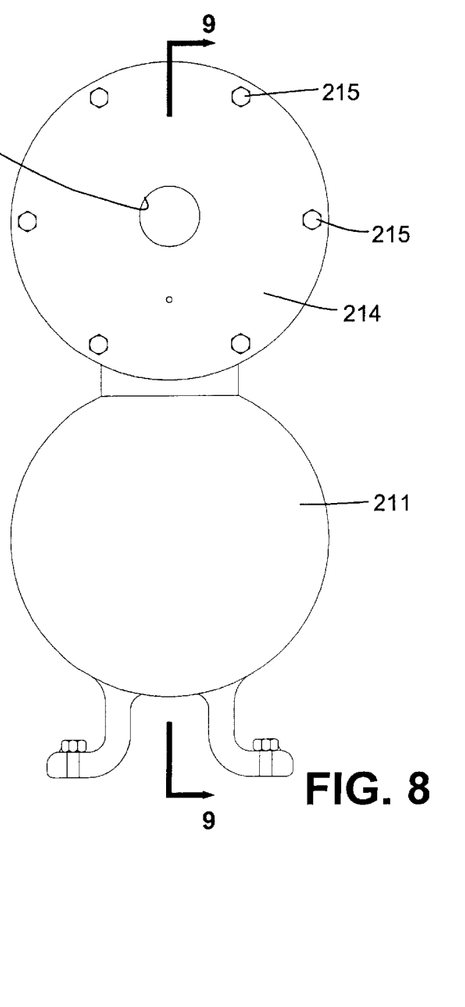
FIG. 8 is an end elevational view of yet another oil reservoir tank assembly with an air-oil separator according to another embodiment of the present invention.
Figure 9:
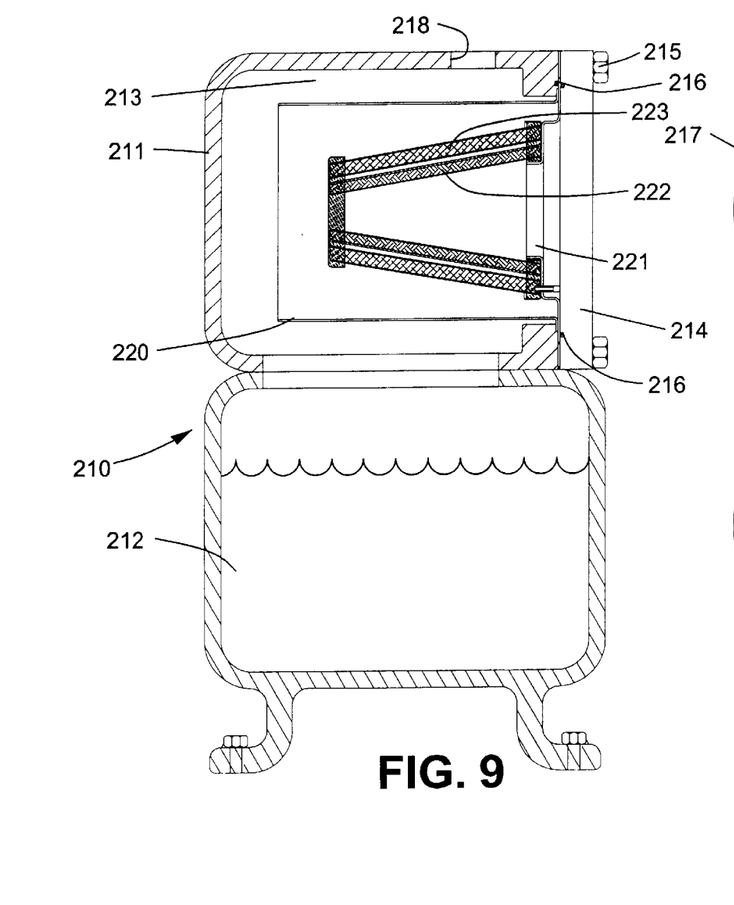
FIG. 9 is a side sectional view taken along line 9—9 of FIG. 8.

FIGS. 8 and 9 shows a tank assembly 210 which incorporates both inside-out air flow and a horizontally mounted air-oil separator. The tank assembly 210 has a body 211, a reservoir 212, a separation chamber 213, a tank cover 214, tank cover bolts 215, a tank seal 216, a shroud 220, and an air-oil separator 221 comprising a drain stage layer 223 and a coalescing stage layer 222, each of which is generally similar to the body 11, the reservoir 12, the separation chamber 13, the tank cover 14, the tank cover bolts 15, the tank seal 16, the shroud 20, the drain stage layer 23 and the coalescing stage layer 22 already described.

Unlike the previously described embodiments of the invention, the separator of FIGS. 8 and 9 uses an inside-out flow, with an air inlet 217 is provided in the tank cover 214 and an air outlet 218 is provided in the tank body 211 on top of the tank. Therefore, the coalescing stage layer 222 of the separator is provided inside the drain stage layer 223, and the oil drains from the separator into the reservoir 212. Since the generally conically shaped air-oil separator 221 of this embodiment does not have layers which extend completely horizontally, oil does not tend to accumulate along the bottom of the separator. Instead, the sloped configuration of the bottom of the separator facilitates the drainage of the oil from the separator so that it falls more readily into the reservoir 212.

While the layers of the air-oil separator of this invention have been described as being generally conical or generally frusto-conical, this is intended to include layers which have pleats or soft pleats or ribs, and thus do not have smooth inner or outer surfaces. It is contemplated that layers having such pleats or ribs which are then generally formed into a conical or frusto-conical shape, rather than a cylindrical shape, would realize the advantages of the present invention.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way that is inconsistent with the extent to which the progress in the art has been advanced by the invention.

What is claimed is:

1. A gas-liquid separator for mounting in a tank assembly; the separator comprising:
   (a) an upstream coalescing stage layer having a funnel shape with: a wide end set in hardenable sealing material of a mounting piece having an opening therethrough, and, a narrow end remote from the wide end; and,
   (b) a downstream drain stage layer having a funnel shape with: a wide end adjacent the wide end of the upstream coalescing stage layer, and, a narrow end adjacent the narrow end of the upstream coalescing stage layer;
      (i) the drain stage layer being surrounded by the coalescing stage layer.

2. A gas-liquid separator according to claim 1 wherein:
   (a) the upstream coalescing stage layer and the downstream drain stage layer are separate and individually replaceable.

3. A gas-liquid separator according to claim 1 wherein:
   (a) the upstream coalescing stage layer and the downstream drain stage layer are assembled into an integrated unit.

4. A gas-liquid separator according to claim 1 including:
   (a) an interior support member surrounded by the drain stage layer.

5. A gas-liquid separator according to claim 4 wherein:
   (a) the coalescing stage layer is spaced from the drain stage layer.

6. A gas-liquid separator according to claim 5 wherein:
   (a) the drain stage layer comprises wrapped media.

7. A gas-liquid separator according to claim 6 wherein:
   (a) the drain stage layer is selected from fiberglass, polyester and polypropylene.

8. A gas-liquid separator according to claim 7 wherein:
   (a) the coalescing stage layer is a molded or formed media.

9. A gas-liquid separator according to claim 8 wherein:
   (a) the coalescing stage layer is selected from fiberglass, polyester and polypropylene.

10. A gas-liquid separator according to claim 9 wherein:
    (a) the coalescing stage layer and the drain stage layer are each frusto conical.

11. A gas-liquid separator according to claim 9 including:
    (a) a mounting plate assembly including a flange portion;
       (i) the wide end of the upstream coalescing stage layer being secured to the mounting plate assembly.

12. A gas-liquid separator according to claim 8 wherein:
    (a) the wide end of the drain stage layer is secured to the mounting plate assembly.

13. A gas-liquid separator according to claim 12 wherein:
    (a) the flange portion of the mounting plate assembly extends radially outwardly from the coalescing stage layer.

14. A gas-liquid separator according to claim 12 wherein:
    (a) the mounting plate assembly comprises metal.

15. A gas-liquid separator according to claim 14 wherein:
(a) the flange portion of the mounting plate assembly is separated, by a metal bend, from a remainder of the mounting plate assembly.

16. An assembly comprising:
(a) a liquid reservoir tank assembly including:
  (i) a tank having a gas inlet and a gas outlet; and,
(b) a gas-liquid separator removably mounted in the liquid reservoir tank assembly, the gas-liquid separator comprising:
  (i) an upstream coalescing stage layer having a funnel shape with: a wide end set in hardenable sealing material of a mounting piece having an opening therethrough, and, a narrow end remote from the wide end; and,
  (ii) a downstream drain stage layer having a funnel shape with: a wide end adjacent the wide end of the upstream coalescing stage layer, and, a narrow end adjacent the narrow end of the upstream coalescing stage layer; the drain stage layer being surrounded by the coalescing stage layer.

17. An assembly according to claim 16 wherein:
(a) the tank further includes:
  (i) a tank body having an open end; and,
  (ii) a tank cover removeably positioned to cover the open end in the tank body, the tank cover including the gas outlet.

18. An assembly according to claim 17 including:
(a) a shroud surrounding the gas-liquid separator.

19. An assembly according to claim 18 wherein:
(a) the gas inlet is positioned in an upper portion of the tank body; and,
(b) the shroud is positioned between the gas inlet and the gas-liquid separator.

20. An assembly according to claim 19 wherein:
(a) the gas-liquid separator has a drainstage layer and a coalescing stage layer of frusto-conical shape; and
(b) the gas-liquid separator is mounted with the wide end of the coalescing stage layer positioned above the narrow end of the coalescing separator is stage layer.

* * * * *

UNITED STATES PATENT AND TRADEMARK OFFICE
CERTIFICATE OF CORRECTION

PATENT NO.     : 6,585,790 B2
DATED          : July 1, 2003
INVENTOR(S)    : Linnersten et al.

It is certified that error appears in the above-identified patent and that said Letters Patent is hereby corrected as shown below:

<u>Column 8,</u>
Line 19, "coalescing separator is stage" should read -- coalescing stage --

Signed and Sealed this

Twenty-third Day of September, 2003

JAMES E. ROGAN
*Director of the United States Patent and Trademark Office*